(12) United States Patent
Nobuoka et al.

(10) Patent No.: US 8,701,129 B2
(45) Date of Patent: Apr. 15, 2014

(54) WEB API SERVER PROGRAM, WEB API PUBLICATION METHOD

(75) Inventors: Shinya Nobuoka, Tokyo (JP); Yuichi Nakamura, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 0 days.

(21) Appl. No.: 13/635,150

(22) PCT Filed: Aug. 9, 2011

(86) PCT No.: PCT/JP2011/068112
§ 371 (c)(1),
(2), (4) Date: Sep. 14, 2012

(87) PCT Pub. No.: WO2012/026320
PCT Pub. Date: Mar. 1, 2012

(65) Prior Publication Data
US 2013/0145381 A1    Jun. 6, 2013

(30) Foreign Application Priority Data
Aug. 25, 2010 (JP) ................. 2010-188642

(51) Int. Cl.
*G06F 13/00* (2006.01)
(52) U.S. Cl.
USPC .......................... 719/328; 719/330
(58) Field of Classification Search
USPC .................................. 719/328, 330
See application file for complete search history.

(56) References Cited

U.S. PATENT DOCUMENTS

| | | | |
|---|---|---|---|
| 6,557,024 | B1 | 4/2003 | Saito et al. |
| 7,516,331 | B2* | 4/2009 | Jin et al. .................. 713/187 |
| 2005/0154785 | A1* | 7/2005 | Reed et al. ............... 709/217 |
| 2007/0083618 | A1 | 4/2007 | Kim |
| 2007/0083925 | A1* | 4/2007 | Hargrave et al. ............ 726/14 |
| 2009/0070792 | A1* | 3/2009 | Cable ....................... 719/332 |
| 2011/0185340 | A1* | 7/2011 | Trent et al. ............... 717/104 |
| 2012/0036252 | A1* | 2/2012 | Shi et al. .................. 709/224 |

FOREIGN PATENT DOCUMENTS

| | | |
|---|---|---|
| JP | 2000-76118 A | 3/2000 |
| JP | 2004-151942 A | 5/2004 |
| JP | 2007-109236 A | 4/2007 |
| JP | 2008-172462 A | 7/2008 |

OTHER PUBLICATIONS

OSGi Service Platform Release 4, (retrived Aug. 9, 2010).
Ueda et al.; "Proposal of Integrated Device Cooperation Method with REST Architecture", IPSJ SIG Notes, Nov. 20, 2008; vol. 2008; No. 116, pp. 51-57, 2008-EMB-10(8).

* cited by examiner

*Primary Examiner* — Andy Ho
(74) *Attorney, Agent, or Firm* — Mattingly & Malur, PC

(57) ABSTRACT

There is provided a technique with which a function that an OSGi bundle is equipped with may be published via a web API with ease. A web API server program according to the present invention receives as an HTTP request a class name and method name of an OSGi bundle (OSGi service) registered with an OSGi framework, calls and executes an OSGi bundle (OSGi service) that matches them, and returns a result thereof as an HTTP response (see FIG. 2).

12 Claims, 7 Drawing Sheets

| | HTTP request | HTTP response |
|---|---|---|
| Calling ServiceB.func1() | http://host10/webapi?service=ServiceB &function=func1&arg1=hello | ret=5 |
| Calling ServiceB.func2() | http://host10/webapi?service=ServiceB &function=func2&arg1=world&arg2=3 | ret=world &ret=world &ret=world |

| HTTP request | HTTP return value |
|---|---|
| http://host10/webapi?getservicelist=true | ret=<br>ServiceB:<br>public int func1(String);<br>public String[] func2(String, int);<br>&ret=<br>ServiceC:<br>public int adder(int, int); |

FIG. 10

| JAVA type | Request parameter example | Response example |
|---|---|---|
| boolean | arg1=true | ret=true |
| char | arg1=a | ret=a |
| byte | arg1=127 | ret=127 |
| short | arg1=32767 | ret=32767 |
| int | arg1=2147483647 | ret=2147483647 |
| long | arg1=888 | ret=888 |
| float | arg1=3.14 | ret=3.14 |
| double | arg1=3.1415 | ret=3.1415 |
| String | arg1=hello world (hello%20world) | ret=hello world(hello%20world) |
| Array | arg1=1&arg1=2&arg1=99 | ret=1&ret=2&ret=99 |
| Dictionary |  | age=30&height=170&weight=65 |

FIG. 11

|  | Request | Response |
|---|---|---|
| Calling ServiceB.func1() | http://host10/webapi?service=ServiceB&function=func1&arg1=hello | <?xml version="1.0" encoding="utf-8"?> <ret xmlns="http://test.jp">5</ret> |
| Calling ServiceC.func2() | http://host10/webapi?service=ServiceC&function=func2&arg1=world&arg2=3 | <?xml version="1.0" encoding="utf-8"?> <ret xmlns="http://test.jp">world</ret> <ret xmlns="http://test.jp">world</ret> <ret xmlns="http://test.jp">world</ret> |

WEB API SERVER PROGRAM, WEB API PUBLICATION METHOD

TECHNICAL FIELD

The present invention relates to a technique for publishing OSGi bundles compliant with OSGi framework specifications via web APIs.

BACKGROUND ART

FIG. 1 is a diagram showing a configuration of the OSGi framework. The OSGi framework is a service platform that operates on Java (registered trademark) Virtual Machines, and handles Java programs as plug-in modules, making it possible to dynamically add them to applications. The OSGi framework is developed and defined by the OSGi Alliance (Non-Patent Literature 1).

In FIG. 1, an OSGi framework 13 is implemented as a Java application on an OS (Operating System) 11 that runs on a host 10 and a Java VM 12 that runs under the control of the OS 11. The OSGi framework 13 publishes a service registry 131, which is an interface for registering with the OSGi platform 13 services provided by Java modules. A Java module that is compliant with OSGi framework specifications and configured to enable registration with the OSGi framework 13 (to operate in the OSGi framework) is referred to as an OSGi bundle. An OSGi bundle is embodied by Java classes (a group of Java classes, or Java packages, or Java packages comprising a plurality of Java classes), and related configuration files, etc. Further, a service provided by an OSGi bundle is referred to as an OSGi service. An OSGi service is embodied by Java classes.

By way of example, let it be assumed that an OSGi bundleA 14 is already running in the OSGi framework 13. By using the OSGi framework 13, the Java VM 12 is able to add an OSGi bundleB 15, which cooperates with the OSGi bundleA 14, to an application without rebooting the OSGi bundleA 14.

The term cooperate as used above refers to such operations as the OSGi bundleA 14 calling a method that the OSGi bundleB 15 has, the OSGi bundleB 15 calling a method that the OSGi bundleA 14 has, sharing data between the two bundles, and so forth.

Cooperation between OSGi bundles is carried out via the service registry 131 provided by the OSGi framework 13. By way of example, to use a functionB 151 (method (class)) that the OSGi bundleB 15 is equipped with from the OSGi bundleA 14, the OSGi bundleB 15 is registered with the service registry 131 by issuing a predetermined command.

The functionB of the OSGi bundleB 15 registered with the service registry 131 is published on the service registry 131 as an OSGi ServiceB 132. The OSGi bundleA 14 is able to obtain the OSGi ServiceB 132 from the service registry 131 and execute a method corresponding to (included in) the functionB 151.

On the other hand, to use the function 151 that the OSGi bundleB 15 is equipped with from outside of the host 10, a communications interface for that purpose must be provided within the OSGi bundleB 15. By way of example, to use the function 151 from a client terminal 20 using HTTP (Hyper Text Transfer Protocol), a web API server unit 152 equipped with a web API server function must be provided within the OSGi bundleB 15.

The term web API server is used above to refer generally to interfaces for executing applications via a network using HTTP and obtaining the results thereof, e.g., CGI (Common Gateway Interface), as well as web server functions for that purpose. Specific implementation means are by no means limited to CGI, and any implementation method may be used so long as it accepts requests via HTTP and returns the execution results thereof as an HTTP response.

CITATION LIST

Non-Patent Literature

Non-Patent Literature 1: OSGi Service Platform Release 4, URL: http://www.osgi.org/Release4/HomePage (retrieved Aug. 9, 2010)

SUMMARY OF INVENTION

Technical Problem

Publishing a function that an OSGi bundle is equipped with to a network and enabling use thereof via the network require a server function, as in the web API server unit 152 shown in FIG. 1, as well as an interface for publishing the function. However, implementing such a function for each OSGi bundle whose function is to be published presents a significant burden in terms of development man-hours, etc.

The present invention has been made to address such problems, and an object thereof is to provide a technique that allows a function that an OSGi bundle is equipped with to be published with ease via a web API.

Solution to Problem

A web API server program according to the present invention receives as an HTTP request a class name and method name of an OSGi bundle registered with an OSGi framework, calls and executes the OSGi bundle that matches them, and returns the results thereof as an HTTP response.

Advantageous Effects of Invention

With a web API server program according to the present invention, an OSGi bundle (OSGi service) whose function is to be published to a network may be published to the network automatically via a web API by simply registering it with an OSGi framework. Accordingly, it becomes no longer necessary to implement a web API server function in individual OSGi bundles, thus making it possible to provide an OSGi bundle as a web service without the burden of development.

BRIEF DESCRIPTION OF DRAWINGS

FIG. 10 is a diagram showing examples of HTTP request parameters, which may be specified when calling OSGi services via the web API bundle 17, and of responses.

FIG. 11 is a diagram showing an example in which XML is used for the format of responses.

DESCRIPTION OF EMBODIMENTS

<Embodiment 1>

Figure 2:
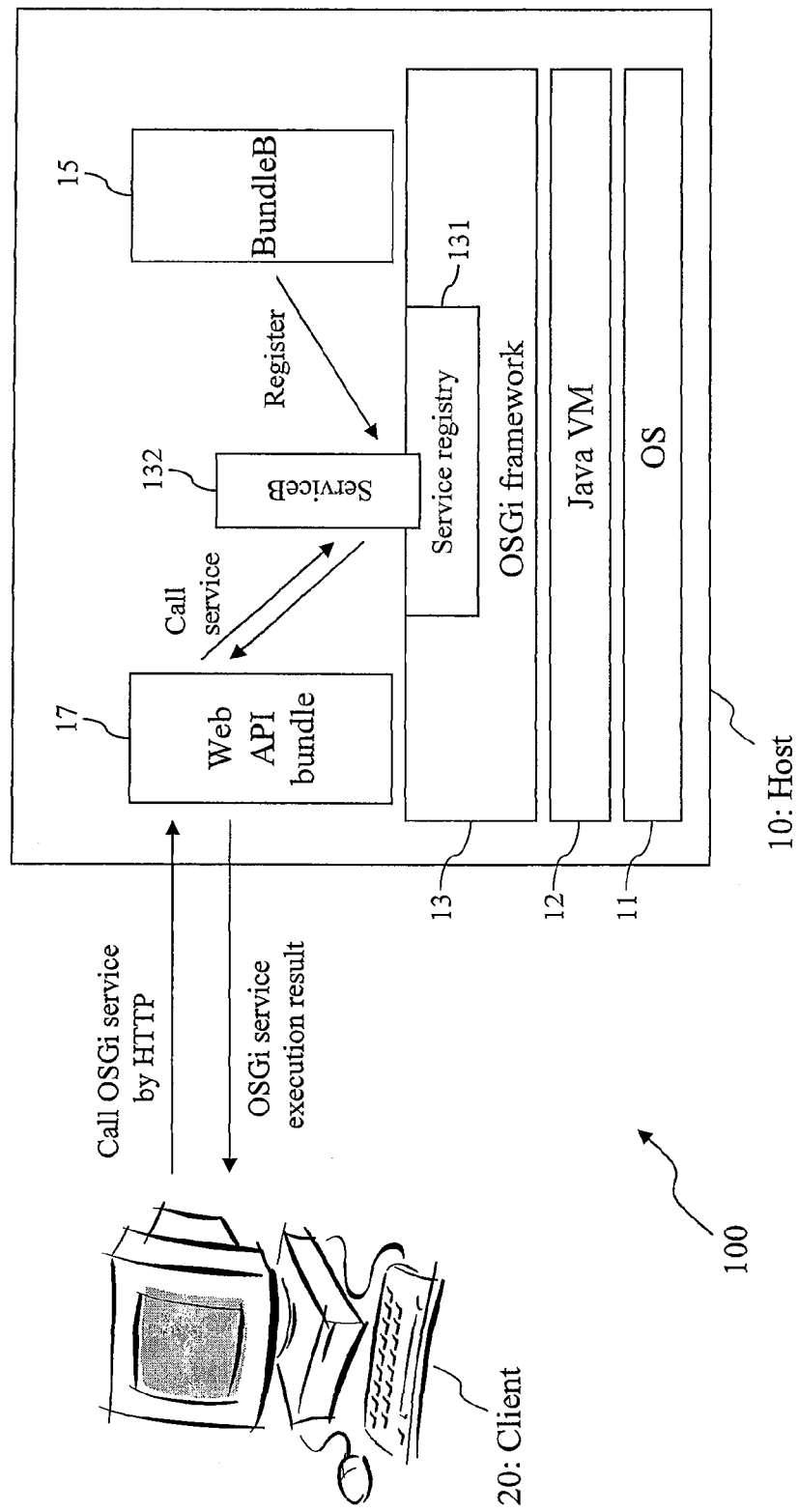
FIG. 2 is a configuration diagram of a web system 100 according to Embodiment 1.

FIG. 2 is a configuration diagram of the web system 100 according to Embodiment 1 of the present invention. The web system 100 is a system so arranged that an application running on the host 10 is used from the client 20 via a network. The client 20 accesses the host 10 using HTTP, requests the desired function, and receives the execution results thereof as an HTTP response.

Figure 1:
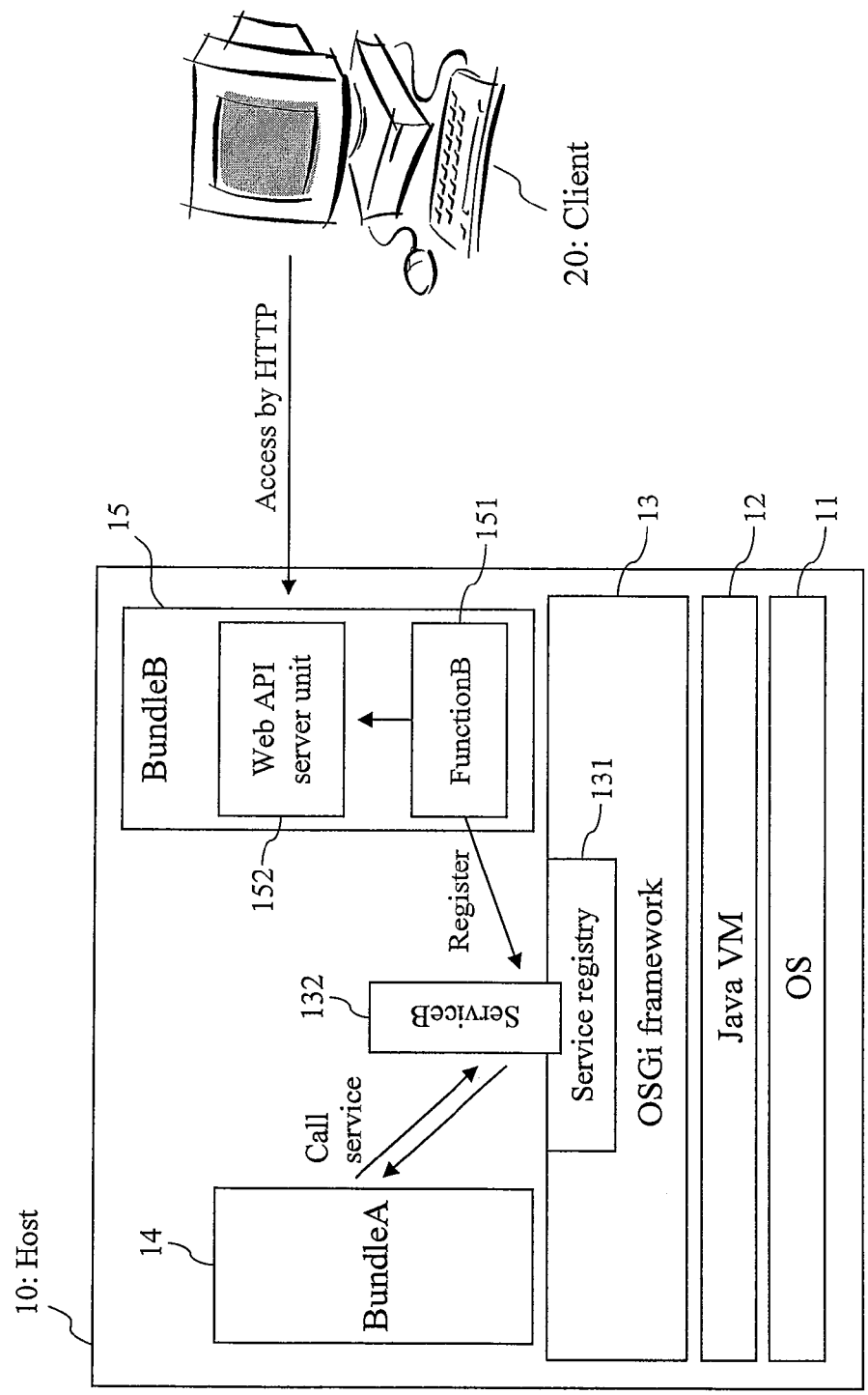
FIG. 1 is a diagram showing the configuration of an OSGi framework.

The host 10 comprises the web API bundle 17 in place of the OSGi bundleA 14 described in connection with FIG. 1. Other configurations are similar to that in FIG. 1 (bundleB does not have a web API server unit). For purposes of convenience, functionB, which is a Java object that the OSGi bundleB 15 has, as registered with the OSGi framework 13 will be referred to as ServiceB 132.

It is assumed that the host 10 comprises any components required of a host computer such as a processing unit that executes the OS 11, the Java VM 12, etc., e.g., a CPU (Central Processing Unit), etc., a storage unit for storing such programs and various OSGi bundles, e.g., an HDD (Hard Disk Drive), etc., requisite memory, network interface, and so forth.

For purposes of convenience, the OSGi framework 13 or programs such as the various OSGi bundles are depicted as operative actors. It is, however, noted that these programs are actually executed by the CPU that the host 10 comprises, and, further, the Java VM 12 executed by the CPU.

The web API bundle 17 is implemented as an OSGi bundle. The web API bundle 17 is not for registering (an OSGi service) with the service registry 131, but is instead a module for calling and executing a service registered with the service registry 131 upon accepting a request from the client 20, and for returning the results thereof. The web API bundle 17 operates under the control of the Java VM 12, and provides a web server function for awaiting an HTTP request from the client 20. The web API bundle 17 corresponds to a "web API server program" in the context of the present invention.

The client 20 accesses a web API published by the web API bundle 17 using HTTP, and requests execution of a service provided by the web API bundle 17 (in this case, the ServiceB 132). The web API bundle 17 processes the request, and returns the execution results to the client 20 as an HTTP response.

Figure 3:
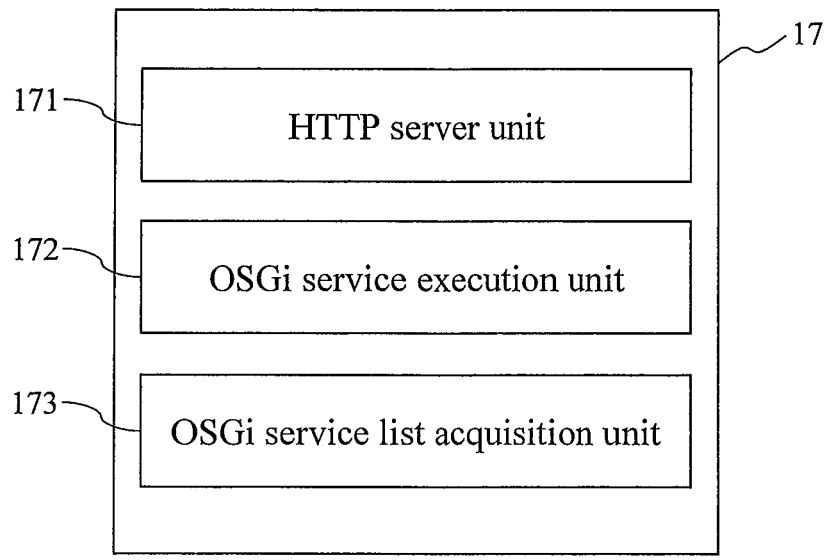
FIG. 3 shows a functional block diagram of a web API bundle 17.

FIG. 3 shows a functional block diagram for the web API bundle 17. The web API bundle 17 comprises an HTTP server unit 171, an OSGi service execution unit 172, and an OSGi service list acquisition unit 173. These functional units may be implemented as Java methods that the web API bundle 17 comprises.

The HTTP server unit 171 is equipped with web server functions for accepting an HTTP request from the client 20 and returning an HTTP response. The OSGi service execution unit 172 obtains and executes an OSGi service registered with the service registry 131. The OSGi service list acquisition unit 173 obtains a list of OSGi services registered with the service registry 131.

Figure 4:
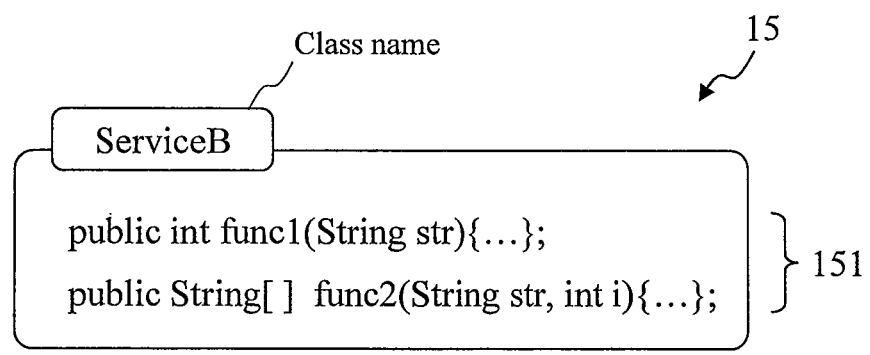
FIG. 4 is a diagram schematically showing the contents of an OSGi service.

FIG. 4 is a diagram schematically showing the contents of an OSGi service. The example shown here is a case where functionB that the OSGi bundleB 15 is equipped with is registered as ServiceB 132, which is an OSGi service.

An OSGi service is embodied by an instance of a Java class that forms (or is possessed by) an OSGi bundle registered with the service registry 131. Registering an OSGi service with the service registry 131 is to generate an instance of a Java class that forms (or is possessed by) an OSGi bundle, and passing a reference thereto to the service registry 131.

On the OSGi service user side, this Java instance that the service registry 131 holds is obtained with the class name as a key, and an OSGi service is used by executing a method that that class has.

In the example shown in FIG. 4, the Java class on the OSGi service user side (e.g., the web API bundle 17) obtains ServiceB 132 from the service registry 131 with the class name "ServiceB" as a key, and executes methods "func1", "func2", and so forth. These methods correspond to the function 151 provided by the OSGi bundleB 15.

Figures 5, 6:
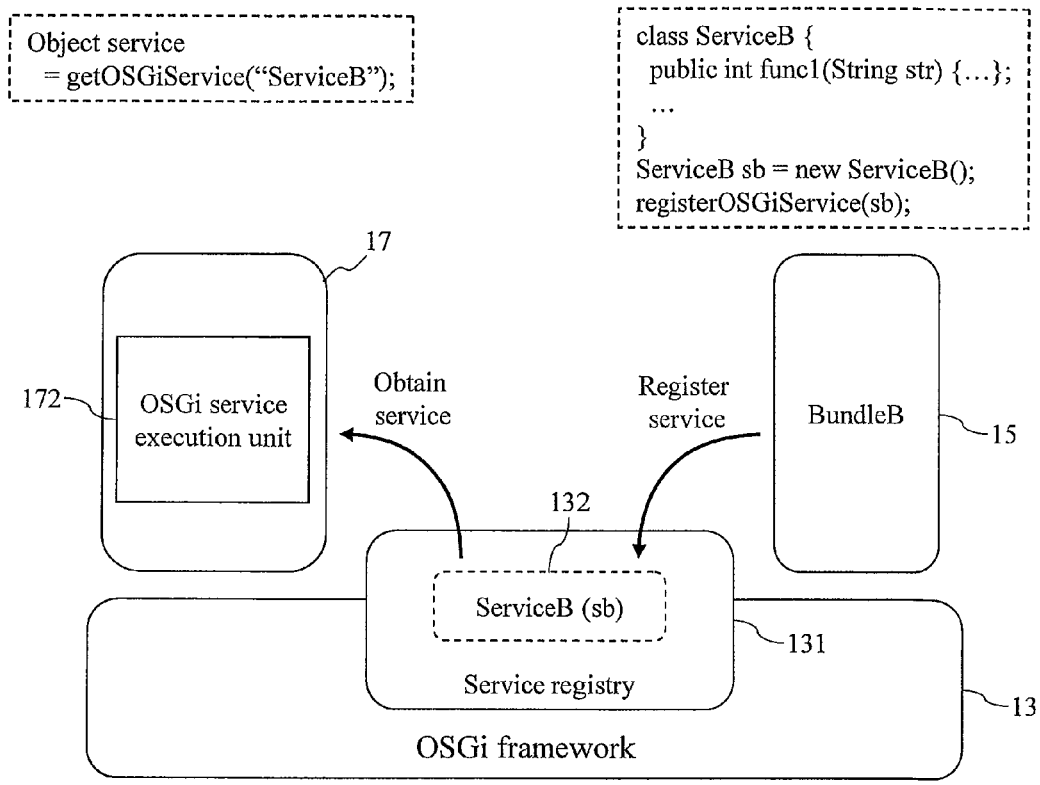
FIG. 5 is a conceptual diagram showing a process of registering the OSGi bundleB 15 with the service registry 131, up to its execution as an OSGi service.
FIG. 6 is a diagram showing the correspondence between HTTP requests, which specify a class name and a method name and request execution results to be returned, and the responses thereto.

FIG. 5 is a conceptual diagram showing a process of registering the OSGi bundleB 15 with the service registry 131, up to its execution as an OSGi service. To illustrate the relationship between an OSGi service and a Java instance, simplified source code samples are indicated. The source code samples are for illustration purposes only, and it is noted that they do not necessarily indicate actual source code.

The OSGi bundleB 15, which is a provider of an OSGi service, generates a ServiceB object, and register it with the service registry 131. The service registry 131 holds a reference to an instance of the ServiceB class.

The OSGi service execution unit 172 of the web API bundle 17, which is in the side using the OSGi service, obtains from the service registry 131 a reference to the ServiceB object using as a key the class name "ServiceB" corresponding to the bundle of the desired OSGi service. The OSGi service execution unit 172 (in reality, the Java VM 12) secures the obtained ServiceB object in the memory that the host 10 comprises (since it is for reference purpose, no memory for the object is needed. Only memory for the variable that takes the reference is needed).

The OSGi service execution unit 172 of the web API bundle 17 executes a method that the ServiceB object has, e.g., the "func1" method. The HTTP server unit 171 returns the results thereof to the client 20 in the form of an HTTP response.

In the example described in connection with FIG. 5, it is assumed that the class name and method name of the OSGi bundle providing the OSGi service are known to the web API bundle 17. However, in general, class names and method names of OSGi bundles are not always known, depending on the design specifications, etc., of the web system 100. In addition, when implemented as in FIG. 5, the connection between the web API bundle 17 and the OSGi bundleB 15 becomes tight, which detracts from the advantages of providing a plug-in mechanism by the OSGi framework 13.

As such, considered below is a configuration where a class name and a method name of an OSGi bundle that provides an OSGi service are given from outside of the web API bundle 17 so that any given class name and method name may be called from the service registry 131.

FIG. 6 is a diagram showing the correspondence between HTTP requests, which specify a class name and a method name and request execution results to be returned, from the client 20 to the web API bundle 17, and the responses thereto. The first row shows an example where the "func1" method of the ServiceB 132 is called, and the second row shows an example where the "func2" method of the ServiceB 132 is called.

In issuing an HTTP request to the web API bundle 17, the client 20 includes, as request parameters and within the request, the class name providing the OSGi service, a method name thereof, and an argument of the method. If there are a plurality of arguments, a corresponding number of request parameters are provided.

Upon receiving the HTTP request, the HTTP server unit 171 of the web API bundle 17 extracts the request parameter portion and passes it to the OSGi service execution unit 172.

With the class name given in the request parameters as a key, the OSGi service execution unit 172 calls from the service registry 131 the OSGi service with the same class name. The OSGi service execution unit 172 executes the method corresponding to the method name given in the request parameters, and returns the results thereof to the client 20 via the HTTP server unit 171. Since HTTP responses are in text format, they may be written in any format. In FIG. 6, there is shown an example where a format similar to that of the request parameters is used. If there are a plurality of return values of the method, this fact is also written into the HTTP response.

If the client 20 specifies within the request parameters a class name or method name that does not exist in the service registry 131, or if the class and method do exist but the argument's type does not match, the OSGi service execution unit 172 and the HTTP server unit 171 issue an exception to inform the client 20 accordingly.

When the OSGi service execution unit 172 obtains a class of an OSGi service using the class name given in the request parameters, the service registry 131, as indicated in the upper left source code example in FIG. 5, passes an OSGi class of type Object, which is a generic class type. It is speculated that this is a requisite design for enabling registration of any given class type with the service registry 131.

However, being a generic class type, type Object is only equipped with very basic methods, and is not equipped with such methods as "func1" and "func2" that the ServiceB class has. As such, the web API bundle 17 uses the function of the java.lang.reflect package, which is capable of invoking any given method using a string held by a string variable.

By using the function of this package, any given method may be invoked while still being of type Object without having to cast an Object class type to a ServiceB class type. In addition to enabling execution of any given method of any given class, this is also advantageous in that it eliminates dependencies on specific classes.

In other words, ordinarily, upon receiving a class name of ServiceB 132 from the client 20 as a request parameter, the web API bundle 17 first casts type Object as obtained from the service registry 131 to type ServiceB before executing a method such as "func1", since type Object does not have that method. However, in order to do so, the ServiceB class would have to be imported within the web API bundle 17 in advance, which compromises the versatility of the web API bundle 17.

By contrast, with the method described above, since no processing for casting to a class type received through a request parameter takes place, there is no longer any need to import that class, making it possible to maintain neutrality and versatility with respect to class types.

Figures 7, 8:
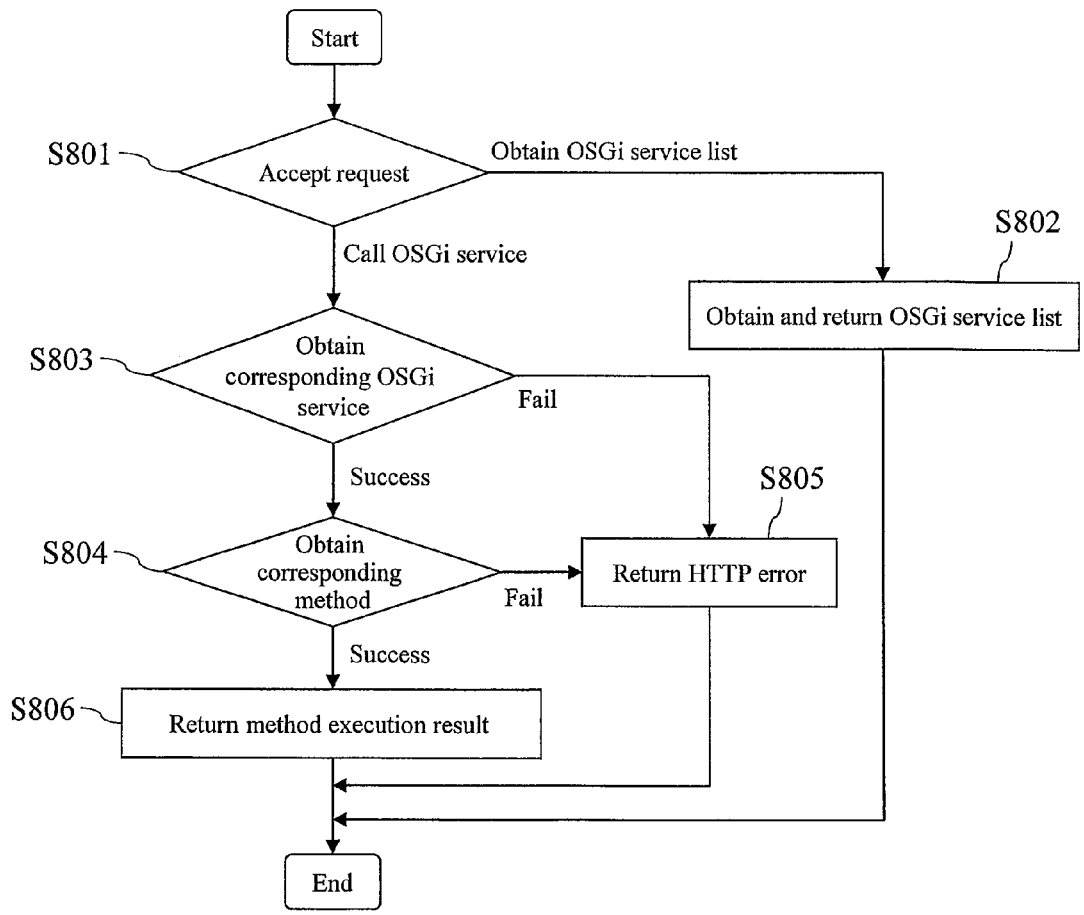
FIG. 7 is a diagram showing an example of an HTTP request, which requests a list of OSGi services registered with the service registry 131 to be returned, and a response thereto.
FIG. 8 is an operation flow of the web API bundle 17.

FIG. 7 is a diagram showing an example of an HTTP request from the client 20 to the web API bundle 17 requesting a list of OSGi services registered with the service registry 131 to be returned, and a response thereto. In issuing an HTTP request to the web API bundle 17, the client 20 includes, within the request and as a request parameter, an indication that it requests a list of OSGi services to be returned. In the example shown in FIG. 7, the parameter "getservicelist=true" corresponds to such an indication.

Upon receiving the above-mentioned HTTP request, the HTTP server unit 171 of the web API bundle 17 extracts the request parameter portion and passes it to the OSGi service execution unit 172.

The OSGi service list acquisition unit 173 obtains a class name list for the OSGi services registered with the service registry 131. Further, using the function of the java.lang.reflect package, it obtains such information as method names, method arguments, method return types, etc., that the classes of each OSGi service have. The OSGi service list acquisition unit 173 returns the obtained results to the client 20 via the HTTP server unit 171.

Functions of the OSGi service list acquisition unit 173 are used, for example, to check whether or not the class name and method name corresponding to the service requested by the client 20 exist within the service registry 131, and so forth.

FIG. 8 is an operation flow of the web API bundle 17. Each step in FIG. 8 is described below.

(FIG. 8: Step S801)

As the web API bundle 17 starts, the HTTP server unit 171 awaits an HTTP request from the client 20. Upon arrival of an HTTP request from the client 20, the HTTP server unit 171 determines whether the request is a request to obtain a list of OSGi services, or a request to call an OSGi service. The process proceeds to step S802 for the former, or to step S803 for the latter.

(FIG. 8: Step S802)

The OSGi service list acquisition unit 173 obtains a list of class names, method names, method arguments, method return types, etc., of the OSGi services registered with the service registry 131. The HTTP server unit 171 returns the obtained results to the client 20 as an HTTP response, and terminates the operation flow. The HTTP server unit 171 awaits the next HTTP request.

(FIG. 8: Step S803)

Using the class name, method name, etc., specified in the HTTP request from the client 20, the OSGi service execution unit 172 calls the corresponding OSGi service from the service registry 131. The process proceeds to step S804 if the call is successful, or to step S805 if it fails.

(FIG. 8: Step S804)

The OSGi service execution unit 172 executes a method of the OSGi service (class) called in step S803. The process proceeds to step S806 if execution is successful, or to step S805 if it fails.

(FIG. 8: Step S805)

The HTTP server unit 171 returns to the client 20 an HTTP response to the effect that an error has occurred, and awaits the next HTTP request. In this step, the fact that an error has occurred may be written in the content portion of the HTTP response, or an error code defined in HTTP may simply be returned. From the perspective of clearly indicating what kind of error has occurred, the former is preferable.

(FIG. 8: Step S806)

The HTTP server unit 171 describes within the HTTP response the results of executing the OSGi service by the OSGi service execution unit 172, and returns it to the client 20. The HTTP server unit 171 awaits the next HTTP request.

<Embodiment 1: Conclusion>

As discussed above, the web API bundle 17 according to Embodiment 1 receives an HTTP request, which specifies a class name, method name, etc., of an OSGi service to be executed, executes the method, and returns the results thereof as an HTTP response. Thus, by registering with the service registry 131 OSGi services of OSGi bundles to be published to a network, they are automatically published to the network as web APIs. Consequently, there is no longer any need to individually implement an HTTP server function, etc., which enables a reduction in the burden of development.

In addition, after obtaining an OSGi service from the service registry 131, the web API bundle 17 according to Embodiment 1 directly executes the method specified by the client 20 without casting type Object, which is a generic class type, to an OSGi bundle class type. Thus, the web API bundle 17 is separated from OSGi bundle class types, and versatility is enhanced by eliminating inter-class dependency. In other words, regardless of the kinds of OSGi services are registered with the service registry 131, the web API bundle 17 is able to call and execute a specified class and method, without loading the class types thereof in advance.

In addition, the web API bundle 17 according to Embodiment 1 is able to provide to the client 20 a list of class names, method names, etc., registered with the service registry 131. As a result, before it issues a request, the client 20 is able to find out in advance the possibility of an error occurring, thereby rendering inefficient processing, such as executing a method and determining whether or not the method exists based on whether or not an error is returned, unnecessary.

<Embodiment 2>

In Embodiment 1, OSGi bundles registered with the service registry 131 are unconditionally published to the network. However, it may be the case that some of the OSGi bundles registered with the service registry 131 to use the functions of the OSGi framework 13 are not intended for publication to a network. As such, in Embodiment 2 of the present invention, descriptions will be provided with respect to a method for differentiating between OSGi bundles that are to be published to a network and OSGi bundles that are not. Since it is otherwise similar in configuration to Embodiment 1, the descriptions below will revolve mainly around the differences.

Figure 9:
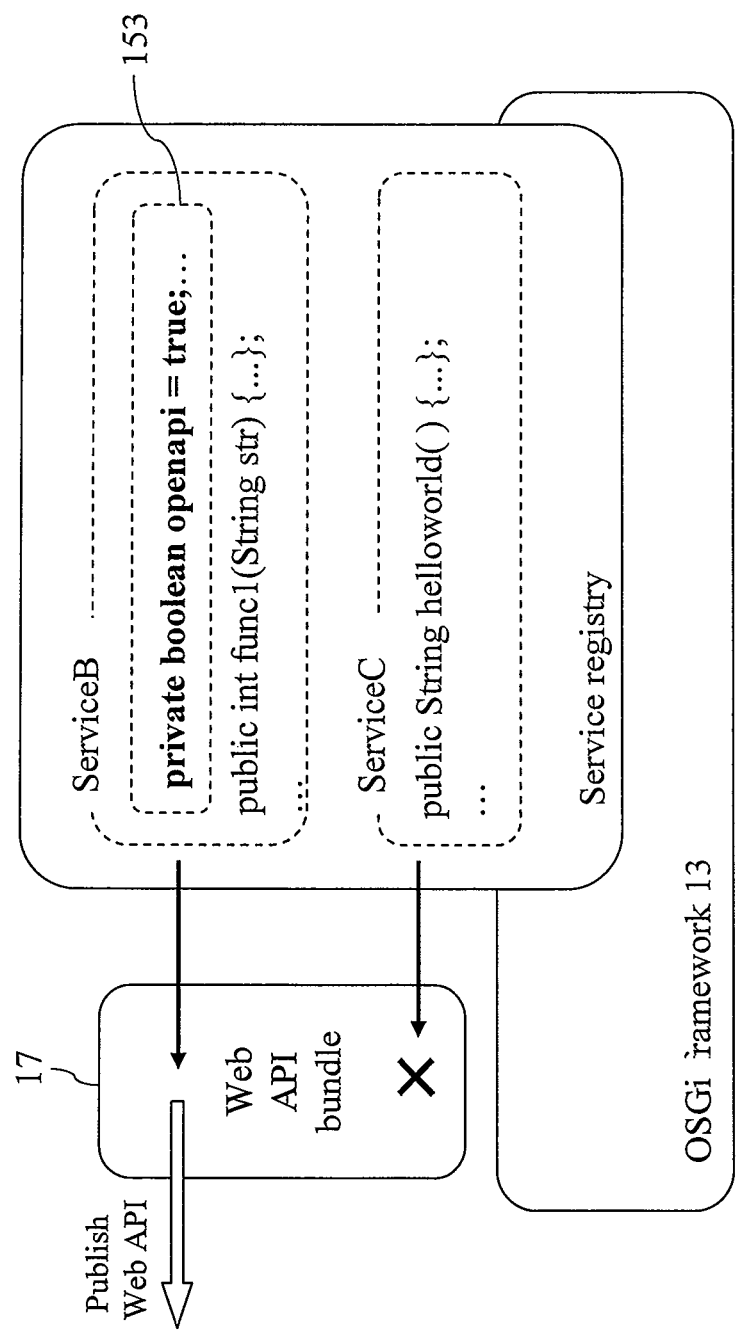
FIG. 9 is a diagram showing, with respect to Embodiment 2, a process by which the web API bundle 17 publishes an OSGi service as a web API.

FIG. 9 is a diagram showing, with respect to Embodiment 2, a process by which the web API bundle 17 publishes an OSGi service as a web API. In Embodiment 2, it is assumed that OSGi bundles to be published to a network as web APIs are provided with a member variable 153 (field) "openapi".

Upon receiving a request to execute an OSGi service, or a request to obtain a list of OSGi services registered with the service registry 131, the web API bundle 17 obtains the member variable "openapi" of the OSGi bundle class obtained from the service registry 131. If the value of this member variable is "true", it is determined that the method that this class has may be published as a web API. If the value of this member variable is not "true", or if this member variable does not exist, the method that this class has is not published as a web API.

If it receives a service execution request for a class that is not published as a web API, the web API bundle 17 returns an error. In addition, it is assumed that, when returning to the client 20 a list of OSGi services registered with the service registry 131, classes that are not published as web APIs are excluded from that list.

When an OSGi bundle class (OSGi service class) is obtained from the service registry 131 by the web API bundle 17, as mentioned in connection with FIG. 5, the class type is type Object. As such, the web API bundle 17 uses the function of the java.lang.reflect package to access the member variable "openapi". With this method, even if this member variable is specified as being private (a declaration prohibiting access from outside of the class), it is possible to access the member variable.

It is noted that, when declaring the member variable "openapi" as being private, since the variable cannot be referenced from other OSGi bundles, the variable is essentially non-existent to other OSGi bundles. In other words, since all OSGi bundles may be handled equally regardless of whether or not a member variable unique to Embodiment 2 is provided, for the OSGi framework 13, it is advantageous in that no particular consideration unique to Embodiment 2 is required.

Embodiment 2: Conclusion>

As discussed above, the web API bundle 17 according to Embodiment 2 checks the value of the member variable "openapi" of an OSGi bundle registered with the service registry 131 to determine whether or not this class may be published as a web API. Since this allows selective publication of just those OSGi bundles intended for publication, the risk of inadvertently publishing to a network OSGi bundles that should not be published is reduced.

Embodiment 3>

In Embodiment 3 of the present invention, additional descriptions are provided with regard to the formats of the HTTP requests and HTTP responses between the client 20 and the web API bundle 17. The configuration of the web system 100 is otherwise similar to those in Embodiments 1 and 2.

FIG. 10 is a diagram showing examples of HTTP request parameters, which may be specified when calling OSGi services via the web API bundle 17, and of responses.

Since HTTP is a text-based protocol, it is difficult to use Java objects directly within requests and responses. Accordingly, what may be used in requests from the client 20 or responses to the client 20 are limited to Java primitive types and the type String (text), which may be expressed in text. In other words, original class types, arrays containing arbitrary class types (e.g., ArrayList), etc., cannot be used.

In addition, although the type Dictionary (a class type similar to an array and which internally stores a plurality of values) may be used within responses, using it as a request parameter is undesirable. This is due to the format of HTTP request parameters.

Since HTTP responses may be written in any given text format including line feed code, all values may be written within a response even if the execution results for a Java method are of type Dictionary and a plurality of values are contained therein.

However, since HTTP request parameters are written by pairing a parameter name and a value thereof, as in "arg1=1", if the parameter value is of type Dictionary and a plurality of values are contained internally, it would have to be nested, as in "arg1=(age=30&height=170)", which is troublesome. Also, in practice, it is rarely necessary to use type Dictionary for arguments. As such, in FIG. 10, it is assumed that type Dictionary is not used for request parameters.

FIG. 11 is a diagram showing an example in which XML (eXtensible Markup Language) is used for the format of responses. The contents of the responses are similar to those in FIG. 6. Such XML format responses are also referred to as REST (Representational State Transfer) format. Since the process of converting a response to XML format is a process that is mostly unrelated to OSGi services, it may be performed by, for example, the HTTP server unit 171.

In addition to responses, HTTP requests may also be written in XML format. By way of example, a SOAP (Simple Object Access Protocol) format XML message may be issued from the client 20 to the web API bundle 17, and that message may be parsed by the HTTP server unit 171 to pass just the necessary parameters to the OSGi service execution unit 172.
<Embodiment 4>

In Embodiments 1 to 3 above, it was assumed that the web API bundle 17 directly receives class names, etc., of OSGi services as HTTP requests. However, a request parameter in which the class name, etc., itself is written does not necessarily have to be used.

By way of example, the web API bundle 17 may receive as a request parameter a text string in which a class name or a method name is converted by a predetermined rule, which is then converted to a class name, method name, etc., of an OSGi service inside the web API bundle 17 or via some appropriate conversion module, etc. In other words, it suffices for the web API bundle 17 to receive a request parameter with which at least a class name, method name, etc., of an OSGi service may be identified.

Reference Signs List

10: Host
11: OS
12: Java VM
13: OSGi framework
131: Service registry
132: ServiceB
14: OSGi bundleA
15: OSGi bundleB
151: FunctionB
152: Web API server unit
153: Member variable
17: Web API bundle
171: HTTP server unit
172: OSGi service execution unit
173: OSGi service list acquisition unit
20: Client
100: Web system

The invention claimed is:

1. A web API server program that causes a computer to execute a process of publishing an OSGi bundle, which is compliant with OSGi framework specifications, via a web API, the program causing the computer to execute:
   a reception step of accepting an HTTP request comprising a parameter which enables identification of a class name of a class registered with the OSGi framework as an OSGi bundle or OSGi service, and of a method name of the class;
   a service calling step of calling, via an interface published by the OSGi framework and from among classes registered with the OSGi framework as an OSGi bundle or OSGi service, a class that matches the class name;
   a service execution step of executing, from among methods included in the class called in the service calling step, a method that matches the method name; and
   a returning step of returning, in the form of an HTTP response, a result of the service execution step to a sender of the HTTP request.

2. The web API server program according to claim 1, wherein
   in the service calling step, the computer is caused to call the class that matches the class name as a generic class type from among the classes registered as an OSGi bundle (OSGi service) with the OSGi framework, and
   in the service execution step, the computer is caused to execute, from among the methods included in the class called in the service calling step, the method that matches the method name without any intermediate process that casts the generic class type into a class type corresponding to the class name.

3. The web API server program according to claim 1, wherein
   the OSGi bundle comprises a member variable indicating whether or not a method included in a class forming the OSGi bundle may be published via a web API, and
   the web API server program causes the computer to execute:
      a publication determination step of determining, by checking a value of the member variable included in the class called in the service calling step, whether or not a method included in the class may be published via a web API; and
      the service execution step and the returning step only for a method included in a class determined to be publishable via a web API in the publication determination step.

4. The web API server program according to claim 1, wherein the computer is caused to execute:
   a service list acquisition step of obtaining a list of class names for classes registered with the OSGi framework as an OSGi bundle or OSGi service, method names included in the classes, arguments of the methods, and return types of the methods; and
   a step of returning, in the form of an HTTP response, a result of the service list acquisition step to the sender of the HTTP request.

5. The web API server program according to claim 1, wherein the web API server program is implemented as an OSGi bundle compliant with the OSGi framework specifications.

6. The web API server program according to claim 1, wherein, in the reception step and the returning step, the computer is caused to communicate with the sender of the HTTP request using communications data of SOAP format or REST format.

7. A non-transitory computer readable storage medium storing a program executed by a processor for performing a web API publication method of publishing via a web API an OSGi service provided by an OSGi bundle compliant with OSGi framework specifications, the method comprising:
   a step of accepting an HTTP request comprising a parameter which enables identification of a class name of a class registered with the OSGi framework as an OSGi bundle or OSGi service, and of a method name of the class;
   a service calling step of calling, via an interface published by the OSGi framework and from among classes registered with the OSGi framework as an OSGi bundle, a class that matches the class name;
   a service execution step of executing, from among methods included in the class called in the service calling step, a method that matches the method name; and
   a step of returning, in the form of an HTTP response, a result of the service execution step to a sender of the HTTP request.

8. The non-transitory computer readable storage medium according to claim 7, wherein
   in the service calling step, a computer is caused to call the class that matches the class name as a generic class type from among the classes registered as an OSGi bundle (OSGi service) with the OSGi framework, and
   in the service execution step, the computer is caused to execute, from among the methods included in the class called in the service calling step, the method that matches the method name without any intermediate process that casts the generic class type into a class type corresponding to the class name.

9. The non-transitory computer readable storage medium according to claim 7, wherein the OSGi bundle comprises a member variable indicating whether or not a method included in a class forming the OSGi bundle may be published via a web API, and the web API server program causes a computer to execute:

a publication determination step of determining, by checking a value of the member variable included in the class called in the service calling step, whether or not a method included in the class may be published via a web API; and the service execution step and the returning step only for a method included in a class determined to be publishable via a web API in the publication determination step.

10. The non-transitory computer readable storage medium according to claim 7, wherein the program causes a computer to execute:

a service list acquisition step of obtaining a list of class names for classes registered with the OSGi framework as an OSGi bundle or OSGi service, method names included in the classes, arguments of the methods, and return types of the methods; and a step of returning, in the form of an HTTP response, a result of the service list acquisition step to the sender of the HTTP request.

11. The non-transitory computer readable storage medium according to claim 7, wherein the web API server program is implemented as an OSGi bundle compliant with the OSGi framework specifications.

12. The non-transitory computer readable storage medium according to claim 7, wherein, in the accepting step and the returning step, a computer is caused to communicate with the sender of the HTTP request using communications data of SOAP format or REST format.

* * * * *